US009918206B2

(12) United States Patent
Park et al.

(10) Patent No.: US 9,918,206 B2
(45) Date of Patent: Mar. 13, 2018

(54) MULTICAST SERVICE METHOD AND APPARATUS IN MOBILE COMMUNICATION SYSTEM

(71) Applicant: Samsung Electronics Co., Ltd., Suwon-si, Gyeonggi-do (KR)

(72) Inventors: Seung-Hoon Park, Seoul (KR); Hyun-Kyu Yu, Yongin-si (KR); Su-Ryong Jeong, Yongin-si (KR); Noh-Gyoung Kang, Seoul (KR); Jae-Seung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 14/368,931

(22) PCT Filed: Dec. 31, 2012

(86) PCT No.: PCT/KR2012/011840
§ 371 (c)(1),
(2) Date: Jun. 26, 2014

(87) PCT Pub. No.: WO2013/100739
PCT Pub. Date: Jul. 4, 2013

(65) Prior Publication Data
US 2014/0376444 A1 Dec. 25, 2014

(30) Foreign Application Priority Data
Dec. 30, 2011 (KR) .................. 10-2011-0147423

(51) Int. Cl.
*H04W 4/06* (2009.01)
*H04W 72/00* (2009.01)
(Continued)

(52) U.S. Cl.
CPC ............ *H04W 4/06* (2013.01); *H04W 72/005* (2013.01); *H04L 1/0025* (2013.01); *H04L 12/189* (2013.01); *H04L 2001/0093* (2013.01)

(58) Field of Classification Search
None
See application file for complete search history.

(56) References Cited

U.S. PATENT DOCUMENTS

| 6,148,005 A | 11/2000 | Paul et al. |
| 7,681,101 B2 * | 3/2010 | Oran ................. H04L 1/0009 714/748 |

(Continued)

FOREIGN PATENT DOCUMENTS

| EP | 1 313 260 A2 | 5/2003 |
| KR | 10-2003-0040818 A | 5/2003 |

(Continued)

*Primary Examiner* — Andrew Lai
*Assistant Examiner* — Jamaal Henson
(74) *Attorney, Agent, or Firm* — Jefferson IP Law, LLP

(57) ABSTRACT

A method of providing a multicast service in a mobile communication system includes dividing original multicast data into a plurality of multicast data to generate a plurality of multicast streams having different data rates and transmitting a first transmission frame including the plurality of multicast streams to a plurality of user equipments; receiving a report on a data rate corresponding to an unreceived multicast stream among the plurality of multicast streams from one or more user equipments among the plurality of user equipments; and transmitting a second transmission frame including the unreceived multicast stream to the plurality of user equipments including the one or more user equipments.

20 Claims, 4 Drawing Sheets

(51) Int. Cl.
*H04L 1/00* (2006.01)
*H04L 12/18* (2006.01)

(56) References Cited

U.S. PATENT DOCUMENTS

| | | | |
|---|---|---|---|
| 2002/0152342 A1* | 10/2002 | Das | H04L 1/0003 |
| | | | 710/117 |
| 2003/0039224 A1 | 2/2003 | Koo et al. | |
| 2003/0095561 A1* | 5/2003 | Hwang | H04L 1/0002 |
| | | | 370/432 |
| 2004/0166863 A1 | 8/2004 | Kim et al. | |
| 2006/0067281 A1 | 3/2006 | Kwak et al. | |
| 2007/0230395 A1* | 10/2007 | Guo | H04L 12/18 |
| | | | 370/329 |
| 2007/0233889 A1* | 10/2007 | Guo | H04L 12/189 |
| | | | 709/231 |
| 2008/0062990 A1* | 3/2008 | Oran | H04L 1/1607 |
| | | | 370/392 |
| 2010/0208642 A1 | 8/2010 | Wu et al. | |
| 2010/0214970 A1* | 8/2010 | Brunner | H04L 1/1887 |
| | | | 370/312 |
| 2012/0198506 A1* | 8/2012 | Joe | H04N 21/44209 |
| | | | 725/97 |
| 2013/0189997 A1* | 7/2013 | Urie | H04W 36/04 |
| | | | 455/444 |

FOREIGN PATENT DOCUMENTS

| | | |
|---|---|---|
| KR | 10-2004-0026437 A | 3/2004 |
| KR | 10-2006-0051979 A | 5/2006 |
| KR | 10-2009-0008199 A | 1/2009 |

\* cited by examiner

[Fig. 1]
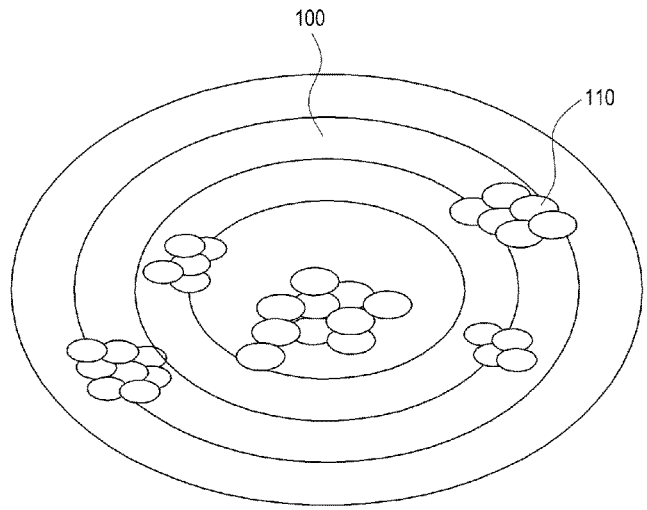
[Fig. 2]
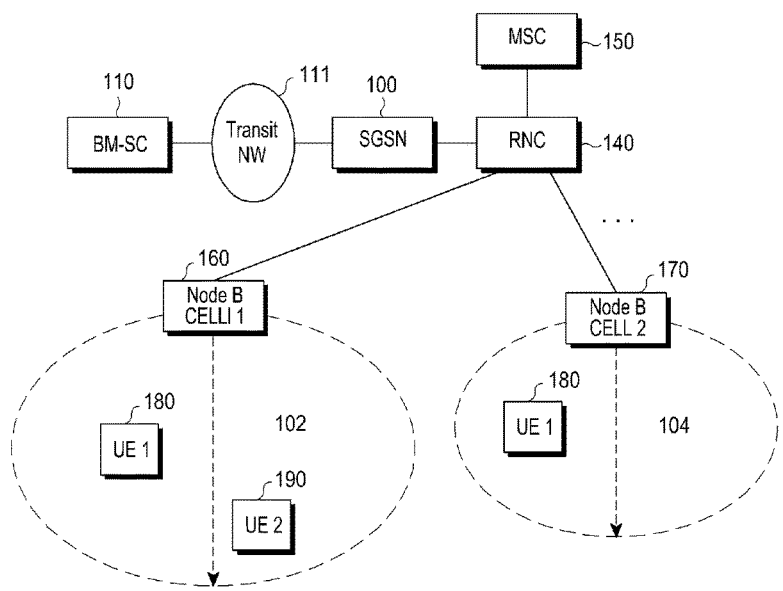
[Fig. 3]
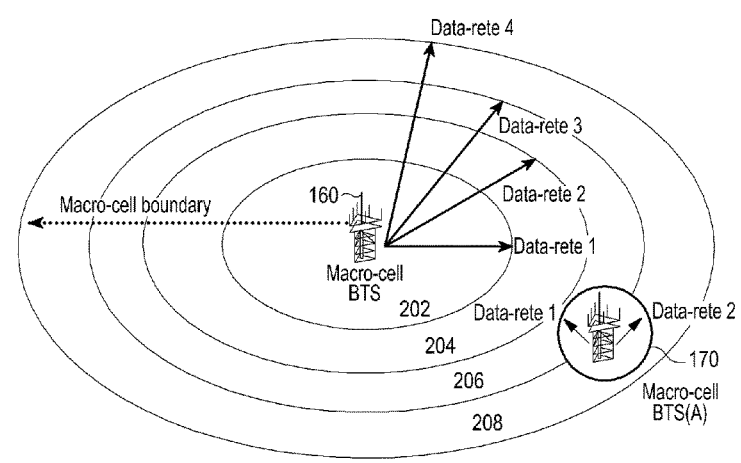

[Fig. 4]
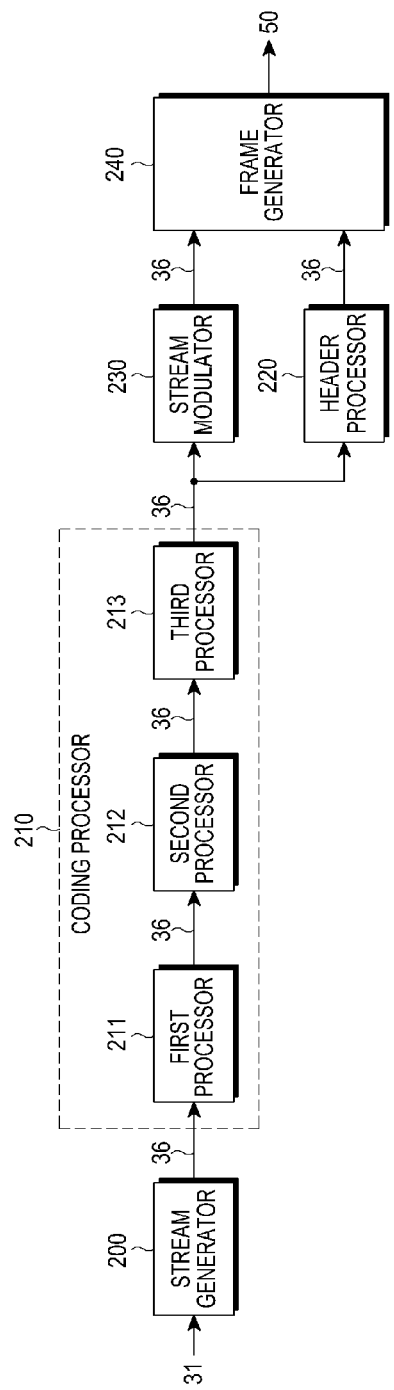

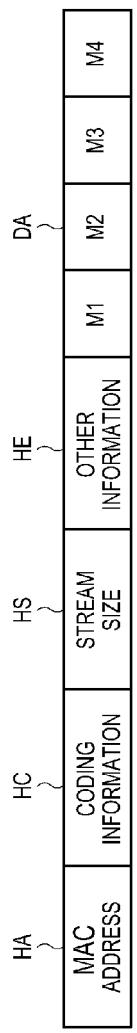
[Fig. 5]

[Fig. 6]
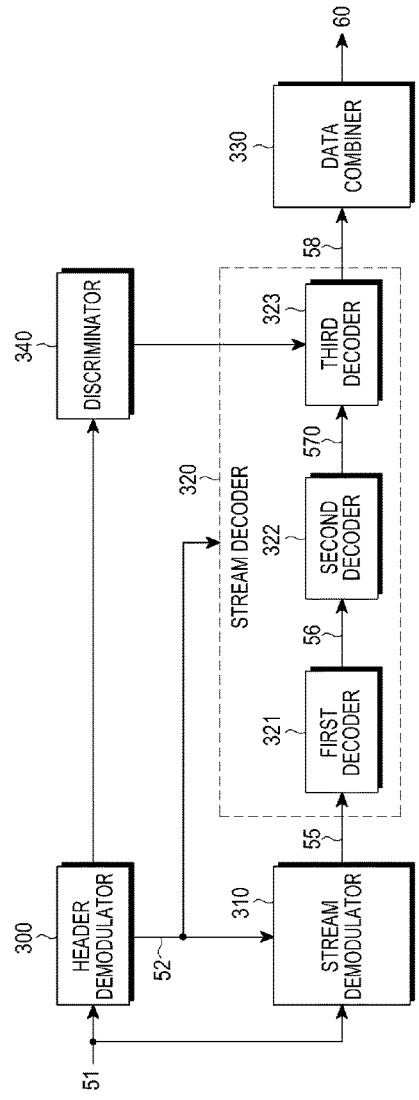
[Fig. 7]
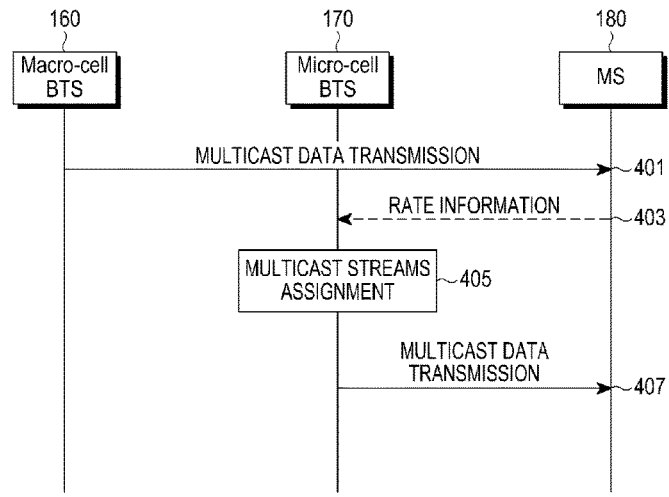

MULTICAST SERVICE METHOD AND APPARATUS IN MOBILE COMMUNICATION SYSTEM

TECHNICAL FIELD

The present invention relates generally to a mobile communication system, and more particularly, to a method and an apparatus for efficiently providing a multicast service in a hierarchical cell structure.

BACKGROUND ART

Services provided by a mobile communication system using a wideband Code Division Multiple Access (hereinafter, referred to as "CDMA") scheme include packet service communication that transmits large capacity data such as packet data and circuit data and a multimedia broadcasting/communication service that can provide a multimedia service as well as a conventional voice service. In order to support the multimedia broadcasting/communication, a Multimedia Broadcasting/Multicast Service (hereinafter, referred to as an "MBMS") in which one multimedia data source or a plurality of multimedia data sources provide a service to a plurality of user equipments is provided.

The MBMS commonly refers to a service that transmits the same multimedia data to a plurality of receivers through a wireless network. At this time, one radio channel is shared by the plurality of receivers so that radio transmission resources can be saved. The MBMS supports multimedia transmission types such as a real time image, a voice, a still image, a text message and the like. The MBMS is a service that can simultaneously transmit voice data and image data according to the multimedia transmission type, which requires a large amount of transmission resources. In the MBMS, since the same data should be transmitted to a plurality of cells where users are located, a Point to Point (hereinafter, referred to as "PtP") access or a Point to Multiple (hereinafter, referred to as "PtM") access is performed according to the number of users located in each cell.

Meanwhile, a service coverage in a mobile communication system can perform various wireless accesses in a mega cell, a macro cell, a micro cell, a pico cell and the like according to a service range and a transmission rate defined in the internal standard of ITU-T Q.1711, and the service coverage is different according to a type of the cells.

Further, the service coverage and a data transmission speed may differ somewhat depending on a mobile communication service scheme, and an example of a service method according to a type of each cell will be described below.

First, the mega cell provides a wideband service that covers a wide area by using a satellite communication network, and a cell radius thereof ranges from 100 Km to 500 Km in which data and voice services can be simultaneously provided. The macro cell has a service radius within 35 Km, which is mainly used for a coverage extension of an area where subscribers' call volume is small such as a rural area and a semi-smooth area in the mobile communication system, A coverage of the micro cell ranges from 0.5 km to 1 km, and a visibility propagation path where a mobile station can see a node B antenna becomes a main transmission path. Further, the pico cell installs an optical distributed system or a small repeater within a building to provide a service to a building-concentrated area and a building with a basement within an urban center within a radius of 50 m. The optical distributed system within the building provides an in-building service by connecting a transmission line (E1 line) from a switching center to an optical distributed node B within the building and installing an optical cable within the building and attaching an antenna to the building. The small repeater receives a terrestrial signal and provides a service to a basement of the building by using an omni antenna or a patch antenna. A data transmission rate corresponds to a maximum of 2 Mbps.

A cell service area and an application area vary depending on each service in the mobile communication, and a distance range and a subscriber acceptance capacity within the cell area are changed according to a position of the node B antenna, a height of the antenna, a beam type of the antenna, a slope of the antenna, a control of transmission power and the like.

As described above, providing a service with various divisions according to a cell scale and a transmission rate within the same area is referred to as a Hierarchical Cell Structure (hereinafter, referred to as an "HCS"). For example, when a service for the micro cell and a service for the macro cell are simultaneously provided to a particular area, it may be considered that the area configures the HCS.

FIG. 1 illustrates an example of the HCS. Referring to FIG. 1, the HCS can be designed such that a plurality of micro cells 20 overlaps in a macro cell 10 area. The MBMS may be also provided through the HCS.

In general, in the HCS system, the macro cell provides a service for a high speed mobile user and a low speed data transmission service, and the micro cell provides a service for a low speed mobile user and a high speed data transmission service.

More specifically, since the macro cell has a wide cell coverage but has a limited service capacity, it is preferable that the macro cell provides the service to the user who requires the low speed data transmission service. Further, when the micro cell provides the service to the high speed mobile user, a service efficiency may be deteriorated due to a frequent handoff. Accordingly, it is preferable that the macro cell provides the service to the high speed mobile user instead of the micro cell.

In addition, according to a cell load of the macro cell or the micro cell, a method of providing a service may be changed. That is, when a cell load of a particular micro cell is very large, a method in which the macro cell provides the service to the high speed mobile user is proposed.

Meanwhile, in connection with a method of providing the MBMS in the HCS, the micro cell provides a particular service when the number of micro cells providing the particular service is very small, and the macro cell provides the service when the number of micro cells is large.

DISCLOSURE OF INVENTION

Technical Problem

However, in the MBMS, when the micro cell exclusively provides the high speed data transmission service, the number of particular multicast users increases or Quality of Service (QoS) may be deteriorated due to a frequent handoff. On the other hand, when the macro cell exclusively provides the MBMS, loads of the macro cell are further affected as a data transmission rate of the MBMS increases.

Meanwhile, although a method of dynamically selecting a hierarchy of the MBMS is provided, the method generates a frequent handoff between hierarchies while providing the service, so that a serious capacity reduction may occur in the macro cell due to the MBMS service providing data at high speed.

Particularly, a service providing a real time stream service such as the MBMS may more seriously generate the above problem.

In order to solve the above problems, the present invention provides a multicast service method and apparatus capable of providing a high quality service while reducing loads of a network when providing a multicast service in a mobile communication system having a hierarchical structure.

Solution to Problem

In accordance with an aspect of the present invention, a method of providing a multicast service in a mobile communication system is provide. The method includes dividing original multicast data into a plurality of multicast data to generate a plurality of multicast streams having different data rates and transmitting a first transmission frame including the plurality of multicast streams to a plurality of user equipments; receiving a report on a data rate corresponding to an unreceived multicast stream among the plurality of multicast streams from one or more user equipments among the plurality of user equipments; and transmitting a second transmission frame including the unreceived multicast stream to the plurality of user equipments including the one or more user equipments.

Advantageous Effects of Invention

The present invention provides a multicast service method and apparatus capable of providing a high quality service while reducing loads of a network when providing a multicast service in a mobile communication system having a hierarchical structure.

BRIEF DESCRIPTION OF DRAWINGS

FIG. 1 illustrates an example of a hierarchical cell structure;

FIG. 2 illustrates a configuration of a mobile communication system to which the present invention is applied;

FIG. 3 illustrates a hierarchical cell structure according to an embodiment of the present invention;

FIG. 4 illustrates a configuration of an RNC transmitter according to an embodiment of the present invention;

FIG. 5 illustrates a configuration of a transmission frame of multicast data according to an embodiment of the present invention;

FIG. 6 illustrates a configuration of a receiver of a user equipment according to an embodiment of the present invention; and FIG. 7 illustrates an operation process of a mobile communication system according to an embodiment of the present invention.

MODE FOR THE INVENTION

Hereinafter, various embodiments of the present invention will be described with reference to the accompanying drawings. In the following description, a detailed description of known functions and configurations incorporated herein will be omitted when it may make the subject matter of the present invention rather unclear. Further, in the following description of the present invention, a detailed description of known functions and configurations incorporated herein will be omitted when it may make the subject matter of the present invention rather unclear.

A multicast refers to transmitting the same information to a plurality of receivers (or receiving apparatuses, hereinafter, referred to as "receiving apparatuses") by one time transmission. A multicast technology is used for transmitting super high-speed multimedia data and the like in that network resources can be efficiently used without a waste. An example of the multicast service may include the MBMS.

In transmission of data by the multicast service (hereinafter, referred to as "multicast data"), data amounts received by each receiving apparatus through a network for a unit time (data rate) may be different. At this time, when the transmitting apparatus transmits data at the same data rate, the transmitting apparatus should transmit the data at a lowest data rate in order to allow all receiving apparatuses to receive the data. When the transmitting apparatus increases the data rate, the receiving apparatus having a lower data rate than the data rate cannot receive the data transmitted by the transmitting apparatus.

In order to solve the above problem, a method of dividing multicast data into a plurality of streams, and then transmitting only a part of the streams to the receiving apparatus having the low data rate and transmitting all the streams to the receiving apparatus having a higher data rate is used. Accordingly, in order to make the method effective, a part of total data (basic data) such as image or voice data may contain most basic information to provide low quality original data, and the remaining data (additional data) may contain more detailed information and be added to the basic data to provide high quality original data. Such a data structure is considered to be scalable, and a representative coding method using scalability includes Motion Picture Experts Group 4 (MPEG4).

The present invention provides multicast data having the scalable data structure when providing a multicast service in a mobile communication system employing an HCS. A data transmission rate may be changed according to a distance from a node B and is generally lowered the distance from the node B becomes far.

Accordingly, in the present invention, a radio network controller divides total multicast data corresponding to a particular service and generates a plurality of multicast streams corresponding to a predetermined data rate. Among the plurality of multicast streams, a main multicast stream containing basic data which may contain basic information of the total multicast data to transmit a low quality original service by itself is generated to have a lowest data rate, and the remaining sub multicast streams sequentially correspond to higher data rates.

Further, a node B of the macro cell transmits total multicast streams, and a user equipment located in the macro cell reports a multicast stream which has not been normally processed among the received multicast streams to the node B of the macro cell or a node B of a neighboring micro cell. According to contents of the report, the node B of the micro cell transmits the multicast stream which has not been normally received by the user equipment to the corresponding user equipment, and the user equipment combines multicast streams received from the node B of the macro cell and the node B of the micro cell and provides a corresponding service to a user.

A system providing the MBMS will be described as an example of the multicast service to which the present invention is applied. A configuration of the mobile communication system providing the MBMS according to an embodiment of the present invention will be described with reference to FIG. 2. FIG. 2 schematically illustrates nodes involved in the MBMS in a mobile communication network. In FIG. 2, User Equipments (UEs) 180 and 190 refer to terminal devices or participants which can receive the MBMS, and cell #1 102 and cell #2 104 refer to logical or geographical areas where MBMS related data is wirelessly transmitted to the participants and are controlled by node Bs 160 and 170. Further, it is assumed that cell #1 102 corresponds to the macro cell and cell #2 104 corresponds to the micro cell. Although the cells are illustrated as independent cells in FIG. 2, it is assumed that the cells geographically overlap each other as illustrated in FIG. 1. Accordingly, it is assumed that UE #1 180 is located in an overlapping area between the macro cell 102 and the micro cell 104.

A Radio Network Controller (hereinafter, referred to as an "RNC") 104 controls the plurality of cells 102 and 104 by using the node Bs 160 and 170, selectively transmits multimedia data to a particular cell, and controls a radio channel set to provide the MBMS. Connections between the RNC 140 and the UEs 180 and 190 may be performed by a Radio Resource Control (hereinafter, referred to as "RRC") interface.

The RNC 140 accesses a Packet Switched or Packet Service (hereinafter, referred to as a "PS") network such as the Internet or the like by a Serving GPRS Support Node (hereinafter, referred to as an "SGSN") 130. Communication between the RNC 140 and the PS network may be performed by Packet Switched Signaling (PS signaling). Particularly, a connection between the RNC 140 and the SGSN 130 is called an Iu-PS interface.

The SGSN 130 controls an MBMS related service of each subscriber. Representative examples of roles performed by the SGSN 130 include a role of managing service charging related data of each subscriber, a role of selectively transmitting multimedia data to the particular RNC 140, and the like.

A transit network (NW) 120 provides a communication path between a Broadcast Multicast Service Center (referred to as a "BM-SC") 110 and the SGSN 130 and may be connected to an external network by a Gateway GPRS Support Node (hereinafter, referred to as a "GGSN") (not shown).

The BM-SC 110 is the source of the MBMS data and serves to schedule the multicast data according to the MBMS. Further, the BM-SC 110 provides the multicast data in a scalability type.

Meanwhile, the RNC 140 is connected to a Circuit Switched (hereinafter, referred to as "CS") network (not shown) by a Mobile Switching Center (hereinafter, referred to as an "MSC") 150. The CS network refers to a access-based voice-centered legacy communication network. Communication between the RNC 140 and the MSC 150 is performed by the CS signaling. Particularly, a connection between the RNC 140 and the MSC 150 is called an Iu-CS interface.

Multicast data streams are transferred to the UEs 180 and 190 via the transit network 120, the SGSN 130, the RNC 140, and the cells 102 and 104. Although not illustrated in FIG. 2, there may be a plurality of SGSNs with respect to one MBMS and a plurality of RNCs with respect to each SGSN. Each SGSN selectively transmits data to the RNC, and each RNC selectively transmits the data to each of a plurality of cells. To this end, lists of nodes to which the multicast streams are to be transmitted are stored (that is, the SGSN stores lists of the RNCs, and the RNC stores lists of the cells), and the multicast data is selectively transmitted to only the stored nodes in the future.

As described above, various logical channels for the MBMS are used to successfully transmit the multicast data having been transferred to each cell to the UE. Among the various logical channels, an MBMS Control CHannel (MCCH) carries MBMS control information containing a type of MBMS provided by each cell, channel information, MBMS information in adjacent cells and the like, so that the UE can successfully receive the MBMS. On the other hand, an MBMS Traffic CHannel (MTCH) is a logical channel carrying actual MBMS data. When the MCCH and the MTCH are transmitted with PtM, the MCCH and the MTCH are mapped into a Forward Access CHannel (FACH) corresponding to a type of transport channels, respectively, and the FACH is mapped into a Secondary Common Control Physical CHannel (SCCPCH) to be physically transmitted. At this time, respective MBMSs may be generally mapped into different MTCHs in one cell, and a plurality of MTCHs may be mapped into one S-CCPCH with a Time Division Multiplex (hereinafter, referred to as "TDM") scheme. Here, when a plurality of MBMSs are mapped into one S-CCPCH, the UC may receive an uninterested service. In order to solve the above problem, a 3rd Generation Partnership Project (3GPP) specification uses a logical channel such as an MBMS Scheduling CHannel (MSCH) mapped into the SCCPCH and allows the UE to selectively receive an interested service by inserting scheduling information of MBMS services contained in the S-CCPCH into the MSCH.

In general, a WCDMA system may obtain a gain in an aspect of using transmission power and radio resources by combining data having the same content transmitted from different cells, and it may be applied to the MBMS. If a content of one physical channel is the same as that of a physical channel transmitted from another cell, the physical channels from the two cells can be combined at any time point regardless of a time. Such a combination is referred to as full combining. On the other hand, if only parts of the data of the two channels are the same, only the same parts can be combined, and the combination is referred to as partial combining.

In order to allow the UE to partially combine MBMS signals transmitted from a plurality of cells by different scheduling, partially combinable MBMSs are explicitly notified to the UE. The plurality of cells have different channel codes and transmit respective physical channels, that is, the S-CCPCHs. The S-CCPCHs include time division multiplexed MTCHs related to a plurality of MBMSs by different scheduling.

Accordingly, the RNC serving to schedule MTCHs for each cell schedules the MTCHs mapped into each cell, that is, each S-CCPCH for the MBMSs, and notifies the UE of the combinable MBMSs according to the scheduling. Here, the combinable MBMSs refers to services with the same content transmitted from different cells for the same time section.

Accordingly, partial combining information indicating which physical channel can be combined with each MBMS transmitted from one cell is informed to the UEs located in the corresponding cell through the MCCH transmitted from the cell.

FIG. 3 illustrates a concept of multicast service provision in a hierarchical cell structure according to the present invention. That is, a transmission boundary is approximately divided for each predetermined data rate based on the node B 160 of the macro cell. A first data rate (data-rate 1) 202, a second data rate (data-rate 2) 204, a third data rate (data-rate 3) 206, and a fourth data rate (data-rate 4) 208 are matched from a center of the node B to the outside in an order of higher data rates.

The RNC 140 determines a data rate of each multicast stream by considering the transmission area for each data rate, and accordingly generates the multicast stream. An example of a transmitter of the RNC 140 is illustrated in FIG. 4.

Referring to FIG. 4, FIG. 4 is a block diagram illustrating an embodiment of the RNC 140. Referring to FIG. 2, the transmitter of the RNC 140 includes a stream generator 200, a coding processor 210, a header processor 220, a stream modulator 230, and a frame generator 240.

The stream generator 200 divides multicast data 31 having a scalable data structure according to a data rate to generate a plurality of multicast streams 32 corresponding to a predetermined data rate. At this time, basic data is included in the multicast stream corresponding to a lowest data rate, and the remaining multicast streams sequentially correspond to higher data rates.

The coding processor 210 codes each of the plurality of multicast streams 32. To this end, it is preferable that the coding processor 210 includes a first processor 211 for Forward Error Correction (FEC)-coding each of the plurality of multicast streams 32, a second processor 212 for interleaving each of the FEC-coded multicast streams 33, and a third processor 213 for constellation-mapping each of the FEC-coded and interleaved multicast streams 34.

The coding processing performed by the coding processor 210 refers to channel coding. The channel coding has a function of correcting an error. The FEC coding is used in the wireless communication system and includes a Cyclic Redundancy Check (CRC) code, a convolutional code, a turbo code or the like.

When the FEC coding is not enough to correct the error such as a case where a burst error is generated, interleaving is used. The interleaving is a method of correcting the error by independently and distributively disposing bits within a signal and bits and converting the burst error to a random error.

The constellation mapping refers to adjusting a phase and an amplitude of each constellation in a modulation method such QPSK, QAM or the like.

Referring to FIG. 4, the first processor 211, the second processor 212, and the third processor 213 perform the EFC coding, the interleaving, and the constellation mapping, respectively, which corresponds to only one example, but an order and a coding method thereof may vary depending on a channel state and a state of each receiving apparatus.

The header processor 220 generates headers corresponding to the respective coded multicast streams 35 and modulates them at a predetermined data rate. The header is generated in accordance with each multicast stream and contains information required for receiving each multicast stream by the receiving apparatus.

FIG. 5 is a block diagram of a transmission frame of multicast data according to an embodiment of the present invention. Referring to FIG. 5, the transmission frame of the multicast data includes a header part including an address of the UE receiving each multicast data (HA), coding processing information applied to each multicast stream (HC), a size of each multicast stream (HS), and other required information (HE), and a data stream (DA) including multicast streams. According to an embodiment of the present invention, the header part corresponds to the lowest data rate, that is, the fourth data rate 208. It is assumed that the multicast data is divided into four multicast streams M1, M2, M3, and M4 and basic information is contained in the multicast stream M1. Further, it is assumed that the multicast stream M1 corresponds to the fourth data rate (data-rate 4) 208 which is the lowest data rate, the multicast stream M2 corresponds to the third data rate (data-rate 3) 206, the multicast stream M3 corresponds to the second data rate (data-rate 2) 204, and the multicast stream M4 corresponds to the first data rate (data-rate 1) 202.

The transmission frame generated as described above is transferred to the macro cell node B 160 and the micro cell node B 170.

The transmission frame may be transmitted to associated UEs within the corresponding cell by each of the macro cell node B 160 and the micro cell node B 170. However, it is assumed in the following embodiment that, when the total transmission frame is multicasted by the macro cell node B 160 and the micro cell node B 170 receives a report message on the multicast stream which has not been received from the UEs, the transmission frame including the corresponding multicast stream is configured and then multicasted to the corresponding UEs.

The macro cell node B 160 multicasts the transmission frame including total multicast streams in step 401.

Accordingly, the UE 180 receives and processes the transmission frame, and provides a corresponding service to the user. A configuration of the UE 180 is illustrated in FIG. 6. Referring to FIG. 6, the UE 180 includes a receiver including a header demodulator 300, a stream demodulator 310, a stream decoder 320, and a data combiner 330, and a discriminator 340.

The header demodulator 300 demodulates the header part of one or more transmission frames 51 transmitted from an external transmitting apparatus to generate a header information signal 52. The demodulated header in an embodiment of FIG. 6 has the structure shown in FIG. 5.

The stream demodulator 310 demodulates each of the multicast stream parts according to the header information signal 52 to generate one or more coded multicast streams 55.

The stream decoder 320 decodes the one or more coded multicast streams 55. To this end, it is preferable that the stream decoder 320 includes a first decoder 321 for constellation-demapping each of the coded multicast streams 55, a second decoder 322 for deinterleaving the constellation-demapped multicast streams 56, and a third decoder 323 for FEC-decoding the constellation-demapped and deinterleaved multicast streams 57. With respect to the multicast streams 55, the stream decoder 320 outputs multicast streams, which have been normally processed, to the data combiner 330 and reports multicast streams, which have not been normally processed, to the data combiner 330.

The data combiner 330 combines one or more decoded multicast streams 58 to output data 60 having a scalable data structure.

The discriminator 340 determines the multicast streams, which have not been normally processed, as unreceived multicast streams with reference to the header information signal 52 and the report of the data combiner 330, generates a report message on the determination, and then transmits the report message to an adjacent node B.

It is assumed that it is configured by including a plurality of node B transmitters for simultaneously transmitting MBMS service signals of the interested MBMS through a physical channel of the macro cell node B and partially combinable physical channels of the micro cell node Bs.

Further, it is assumed that, in order to allow the UE to partially combine the MBMS signals transmitted from a plurality of cells by different scheduling, a method of explicitly notifying the UE of partially combinable MBMSs can be used.

When the UE 170 is located in an area 206 corresponding to a cell edge, the multicast streams M3 and M4 of the total multicast streams transmitted from the macro cell node B cannot be normally received or processed, but only the multicast streams M1 and M2 can be received. When the number of receivable multicast streams is only one, the multicast stream is highly likely to be the multicast stream including the basic information. When a plurality of multicast streams are received, it is possible to obtain data having higher quality information by adding multicast streams including additional information to the multicast stream including the basic information.

Accordingly, the UE 180 transmits the report message to report on the multicast stream, which the UE 180 has not received, to the macro cell node B 160 or the neighboring micro cell node B 170 in step 403. For example, the UE 180 may transmit the report message to the nearest node B between the macro cell node B 160 and the neighboring micro cell node B 170.

Since information on the total multicast streams is included in the header part, the UE 180 can know information on the multicast stream which the UE 180 has not received. At this time, the UE 180 may report the unreceived multicast stream by transmitting information on the data rate corresponding to the multicast stream which the UE 180 has not received.

When the macro cell node B 160 or the micro cell node B 170 receives the report message in step 403, the micro cell 170 allocates a multicast slot so that the UE 180 can receive the multicast stream, which the UE 180 has not received, based on the report message transmitted by UEs which have received the multicast stream within the cell. Further, slot allocation information is included in the header part in step 405. In addition, the transmission frame including the corresponding multicast stream is configured and then transmitted to the UE 180 in step 407.

Accordingly, the UE 180 can receive the total multicast streams through the partial combining and provide the corresponding service to the user.

While the present invention has been shown and described with reference to certain embodiments thereof, it will be understood by those skilled in the art that various changes in form and details may be made therein without departing from the spirit and scope of the present invention as defined by the appended claims and equivalents thereof.

The invention claimed is:

1. A method of providing a multicast service in a mobile communication system, the method comprising:
generating a plurality of multicast streams having different data rates using multicast data;
transmitting, via a first base station, a first transmission frame comprising a header and the plurality of multicast streams, to a plurality of user equipments, the header including information related to each of the plurality of multicast streams and data rate information;
receiving, via the first base station or a second base station, a report on a data rate associated with an unreceived multicast stream of the plurality of multicast streams, from one or more user equipments among the plurality of user equipments, the unreceived multicast stream being identified based on the header; and
transmitting, via the second base station, a second transmission frame associated with the unreceived multicast stream to the one or more user equipments, based on the report.

2. The method of claim 1, wherein a main multicast stream of the plurality of multicast streams including data containing basic information of original multicast data to provide a low quality original service corresponds to a lowest data rate, and remaining multicast streams sequentially correspond to higher data rates.

3. The method of claim 2, wherein the first base station supports a macro cell and the second base station supports a micro cell.

4. The method of claim 2, wherein the report on the data rate associated with the unreceived multicast stream comprises a report on different data rates from the data rates associated with the plurality of multicast streams.

5. The method of claim 3, wherein the transmitting of the second transmission frame comprises:
allocating resources for transmitting the unreceived multicast stream based on the data rate reported by the second base station;
configuring the second transmission frame associated with the unreceived multicast stream; and
transmitting the second transmission frame to the plurality of user equipments comprising the one or more user equipments.

6. A mobile communication system for providing a multicast service, the mobile communication system comprising:
a memory having instructions therein;
at least one processor, upon execution of the instructions being configured to generate a plurality of multicast streams having different data rates using multicast data;
a first base station configured to transmit a first transmission frame comprising a header and the plurality of multicast streams to a plurality of user equipments, the header including information related to each of the plurality of multicast and data rate information; and
a second base station configured to:
receive a report message on a data rate associated with an unreceived multicast stream of the plurality of multicast streams, from one or more user equipments among the plurality of user equipments, the unreceived multicast stream being identified based on the header, and transmit a second transmission frame associated with the unreceived multicast streams to the one or more user equipments of the plurality of user equipments.

7. The mobile communication system of claim 6, wherein a main multicast stream of the plurality of multicast streams including data containing basic information of original multicast data to provide a low quality original service corresponds to a lowest data rate, and remaining multicast streams sequentially correspond to higher data rates.

8. The mobile communication system of claim 7, wherein the first base station is further configured to, when the first base station receives the report message from the one or more user equipments, transmit the second transmission frame to the plurality of user equipments including the one or more user equipments.

9. The mobile communication system of claim 8,
wherein the first base station is a base station of a macro cell, and
wherein the second base station is a base station of a micro cell.

10. A method of providing a multicast service in a user equipment, the method comprising:
- receiving a first transmission frame comprising a header and a plurality of multicast streams having different data rates from a first base station, the header including information related to each of the plurality of multicast streams and data rate information;
- identifying an unreceived multicast stream of the plurality of multicast streams based on the header;
- transmitting a report message on a data rate associated with an unreceived multicast stream to a second base station;
- receiving a second transmission frame associated with the unreceived multicast stream from the second base station; and
- combining the multicast streams included in the first transmission frame and the second transmission frame.

11. The method of claim 10, wherein the transmitting of the report message to the second base station comprises:
- determining a multicast stream which has not been normally processed among the plurality of multicast streams as the unreceived multicast stream; and
- configuring the report message.

12. The method of claim 10, wherein a main multicast stream of the plurality of multicast streams including data containing basic information of original multicast data to provide a low quality original service corresponds to a lowest data rate, and remaining multicast streams sequentially correspond to higher data rates.

13. The method of claim 11, wherein the first base station supports a macro cell and the second base station supports a micro cell.

14. The method of claim 11, wherein the report on the data rate associated with the unreceived multicast stream comprises a report on different data rates from the data rates associated with the plurality of multicast streams.

15. The method of claim 10, wherein the transmitting of the report message further comprises:
- identifying the unreceived multicast stream from the plurality of multicast streams.

16. A user equipment for providing a multicast service, the user equipment comprising:
- a memory having instructions therein;
- a network interface connected to a network, the network interface configured to communicate with a first base station and a second base station; and
- at least one processor,
- wherein, upon execution of the instructions, the at least one processor is configured to:
- receive from the first base station, over the network by the network interface, a header and a first transmission frame comprising a plurality of multicast streams having different data rates from a first base station, the header including information related to each of the plurality of multicast streams and data rate information,
- identify an unreceived multicast stream based on the header,
- transmit a report message on a data rate associated with the unreceived multicast stream to a second base station,
- receive a second transmission frame associated with the unreceived multicast stream from the second base station, and
- combine the multicast streams included in the first transmission frame and the second transmission frame.

17. The user equipment of claim 16, wherein the at least one processor is further configured to determine a multicast stream which has not been normally processed among the plurality of multicast streams as the unreceived multicast stream.

18. The user equipment of claim 16, wherein a main multicast stream of the plurality of multicast streams including data containing basic information of the original multicast data to provide a low quality original service, corresponds to a lowest data rate, and remaining multicast streams sequentially correspond to higher data rates.

19. The user equipment of claim 16, wherein the first base station supports a macro cell and the second base station supports a micro cell.

20. The user equipment of claim 16, wherein the report on the data rate associated with the unreceived multicast stream comprises a report on different data rates from the data rates associated with the plurality of multicast streams.

* * * * *